US011107121B2

(12) United States Patent
Gentile et al.

(10) Patent No.: US 11,107,121 B2
(45) Date of Patent: *Aug. 31, 2021

(54) MASTER COMPUTING DEVICE AND METHOD FOR DETERMINING AN ACTUAL NUMBER OF IMPRESSIONS PROVIDED BY A SYNCHRONIZED GROUP OF DEVICES

(71) Applicant: Broadsign Serv, Inc., St. Louis, MO (US)

(72) Inventors: Giovan Gentile, Montreal (CA); Bryan Mongeau, Beaconsfield (CA)

(73) Assignee: Broadsign Serv, Inc., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/793,019

(22) Filed: Feb. 18, 2020

(65) Prior Publication Data
US 2020/0184513 A1    Jun. 11, 2020

Related U.S. Application Data

(63) Continuation-in-part of application No. 16/214,498, filed on Dec. 10, 2018, now Pat. No. 10,609,441.

(51) Int. Cl.
*G06F 3/14*    (2006.01)
*G06Q 30/02*   (2012.01)
*H04L 7/00*    (2006.01)

(52) U.S. Cl.
CPC ....... *G06Q 30/0246* (2013.01); *G06F 3/1454* (2013.01); *G06Q 30/0272* (2013.01); *G06Q 30/0275* (2013.01); *H04L 7/0008* (2013.01)

(58) Field of Classification Search
CPC .......................... H04N 21/43; H04N 21/4307
See application file for complete search history.

(56) References Cited

U.S. PATENT DOCUMENTS

| 4,780,883 A | 10/1988 | O'Connor et al. |
| 10,609,441 B1 * | 3/2020 | Mongeau ............. H04N 21/242 |
| 2008/0177822 A1 | 7/2008 | Yoneda |
| 2010/0103781 A1 | 4/2010 | Rai et al. |
| 2014/0340330 A1 | 11/2014 | Trachtenberg et al. |
| 2015/0142883 A1 | 5/2015 | Ohbi |
| 2015/0304526 A1 | 10/2015 | Maurice et al. |

(Continued)

*Primary Examiner* — Paulos M Natnael
(74) *Attorney, Agent, or Firm* — Breiner & Breiner, L.L.C.

(57) ABSTRACT

Master computing device and method for determining an actual number of impressions provided by a synchronized group of devices comprising the master and one or more slave computing device. The master device transmits a synchronization request to the slave device(s) and determines a number of negative responses received from the slave device(s) in response to the synchronization request. A negative response indicates that one slave device is not capable of displaying digital content. The master device determines a number of displays D capable of displaying digital content based on the number of negative responses received. The master device determines a metric representative of the actual number of impressions provided by the master device and the slave device(s). The metric is calculated based on the number of displays D. The master device transmits the metric to a server and the server calculates the actual number of impressions using the metric.

24 Claims, 9 Drawing Sheets

(56) References Cited

U.S. PATENT DOCUMENTS

| | | |
|---|---|---|
| 2016/0066000 A1 | 3/2016 | Cunningham et al. |
| 2016/0217604 A1 | 7/2016 | De Roos et al. |
| 2016/0302166 A1 | 10/2016 | Dang et al. |
| 2017/0055020 A1 | 2/2017 | Shaw et al. |
| 2017/0244993 A1 | 8/2017 | Rothschild |
| 2017/0308922 A1 | 10/2017 | Mongeau |
| 2018/0109826 A1 | 4/2018 | McCoy et al. |
| 2019/0174172 A1 | 6/2019 | Eubanks |
| 2020/0186865 A1* | 6/2020 | Mongeau .............. G06F 3/1454 |

* cited by examiner

MASTER COMPUTING DEVICE AND METHOD FOR DETERMINING AN ACTUAL NUMBER OF IMPRESSIONS PROVIDED BY A SYNCHRONIZED GROUP OF DEVICES

RELATED APPLICATION

This application claims benefit of U.S. Ser. No. 16/214,498, filed Dec. 10, 2018, entitled "Master Computing Device And Method For Synchronizing Display Of Digital Content", which is incorporated herein by reference in its entirety.

TECHNICAL FIELD

The present disclosure relates to the field of digital signage. More specifically, the present disclosure presents a master computing device and a method for determining an actual number of impressions provided by a synchronized group of devices comprising the master computing device and one or more slave computing device.

BACKGROUND

Signage refers to graphic designs, such as symbols, emblems, words, etc. In advertising, signage refers to the design or use of signs and symbols to communicate a message to a specific group, usually for the purpose of marketing. Digital signage is a sub segment of signage and comprises the use of digital signage display units also referred to as digital signage players. Digital signage players include liquid-crystal displays (LCDs), light-emitting diode (LED) displays, projector screens, etc. A digital signage player displays a succession of digital signage contents, such as still images, videos, etc. Digital signage is a field in great expansion especially for advertising in a public venue (e.g. an airport, a shopping mall, etc.), because of the potential to advertise dynamically, such as is done with an advertising video.

In certain circumstances, it is necessary to have the same digital signage content displayed by a plurality of digital signage players in a synchronous manner. For example, in a waiting hall of an airport, all the digital signage players present in the hall display the same advertising campaign at the same time. Furthermore, by contract with the owner of the advertising campaign, the owner of the digital signage infrastructure has the obligation to have the advertising campaign displayed on all of the digital signage players present in the hall and at the same time. It is not acceptable by the terms of the contract that a single digital signage player fails to display the advertising campaign.

In this context, is it not sufficient to a have a digital signage server send a command to all the digital signage players present in the hall for requesting the display of the advertising campaign simultaneously at a given time. If any one of the digital signage players is not capable of displaying the advertising campaign at the given instant, the terms of the contract with the owner of the advertising campaign are broken. A more sophisticated procedure is necessary for performing the synchronized display of the advertising campaign on all the digital signage players. The procedure needs to provide the capability to address the situation where operating conditions of one of the players do not allow instant display of the advertising campaign.

Furthermore, in some cases, a decentralized digital signage architecture is preferable to a more centralized architecture relying on a digital signage server. In such a decentralized architecture, one of the players acts as a master player and the other players act as slave players. In such a decentralized architecture, the master player assumes the role of a digital signage server and is in charge of controlling the display of digital signage content by the master player itself and by the slave players under its control.

Therefore, there is a need for a master digital signage player and a method for synchronizing display of a digital signage content on the master digital signage player and on one or more slave digital signage player.

Furthermore, the combination of the displays of the master digital signage player and the slave digital signage player(s) provides a nominal number of impressions, which is the sum of the impressions of each display. However, if one of the displays is not capable of displaying digital signage content, the nominal number of impressions is no longer accurate. In this case, an actual number of impressions taking into consideration only the displays capable of displaying digital signage content is an accurate evaluation of the total number of impressions available.

Therefore, there is also a need for a master computing device and a method for determining an actual number of impressions provided by a synchronized group of devices comprising the master computing device and one or more slave computing device.

SUMMARY

According to a first aspect, the present disclosure relates to a method for determining an actual number of impressions provided by a synchronized group of devices comprising a master computing device and one or more slave computing device. The method comprises transmitting, by a processing unit of the master computing device, a synchronization request to the one or more slave computing device. The method comprises, determining by the processing unit of the master computing device, a number of negative responses received from the one or more slave computing device in response to the synchronization request. Each negative response is indicative of one among the one or more slave computing device not being capable of displaying digital content on a display of the one among the one or more slave computing device. The number of negative responses received R is an integer comprised between 0 and N where N is the number of slave computing devices, N being an integer greater or equal than 1. The method comprises determining, by the processing unit of the master computing device, a number of displays D capable of displaying digital content based on the number of negative responses R. D is equal to N+1−R if a display of the master computing device is capable of displaying digital content and D is equal to N−R if the display of the master computing device is not capable of displaying digital content. The method comprises determining, by the processing unit of the master computing device, a metric representative of the actual number of impressions provided by the master computing device and the one or more slave computing device. The metric is calculated based on the number of displays D capable of displaying digital content. The method comprises transmitting, by the processing unit of the master computing device, the metric representative of the actual number of impressions provided by the master computing device and the one or more slave computing device to a server.

According to a second aspect, the present disclosure relates to a non-transitory computer program product comprising instructions executable by a processing unit of a master computing device. The execution of the instructions by the processing unit of the master computing device provides for determining an actual number of impressions provided by a synchronized group of devices comprising the master computing device and one or more slave computing device, by implementing the aforementioned method.

According to a third aspect, the present disclosure relates to a master computing device for determining an actual number of impressions provided by a synchronized group of devices comprising the master computing device and one or more slave computing device. The master computing device comprises a communication interface for exchanging data with the one or more slave computing device, a display and a processing unit comprising one or more processor. The processing unit transmits via the communication interface a synchronization request to the one or more slave computing device. The processing unit determines a number of negative responses received via the communication interface from the one or more slave computing device in response to the synchronization request. Each negative response is indicative of one among the one or more slave computing device not being capable of displaying digital content on a display of the one among the one or more slave computing device. The number of negative responses received R is an integer comprised between 0 and N where N is the number of slave computing devices, N being an integer greater or equal than 1. The processing unit determines a number of displays D capable of displaying digital content based on the number of negative responses R. D is equal to N+1−R if the display of the master computing device is capable of displaying digital content and D is equal to N−R if the display of the master computing device is not capable of displaying digital content. The processing unit determines a metric representative of the actual number of impressions provided by the master computing device and the one or more slave computing device. The metric is calculated based on the number of displays D capable of displaying digital content. The processing unit transmits via the communication interface the metric representative of the actual number of impressions provided by the master computing device and the one or more slave computing device to a server.

In a particular aspect, a processing unit of the server receives the metric transmitted by the master computing device and processes the metric to calculate the actual number of impressions provided by the master computing device and the one or more slave computing device.

In another particular aspect, the actual number of impressions is used by the server for at least one of the following: a bidding process implemented by the server and a proof of play process implemented by the server.

BRIEF DESCRIPTION OF THE DRAWINGS

Embodiments of the disclosure will be described by way of example only with reference to the accompanying drawings, in which.

DETAILED DESCRIPTION

The foregoing and other features will become more apparent upon reading of the following non-restrictive description of illustrative embodiments thereof, given by way of example only with reference to the accompanying drawings.

Various aspects of the present disclosure generally address one or more of the problems related to the synchronization of the display of a digital signage content on a synchronized group of digital signage players. The synchronized group comprises a master digital signage player and one or more slave digital signage player. The master digital signage player is in charge of initiating and controlling the synchronization process. Additionally, the present disclosure also addresses the determination of an actual number of impressions for a synchronized group of digital signage players, taking into consideration display(s) within the synchronized group not capable of displaying digital signage content.

Figure 1:
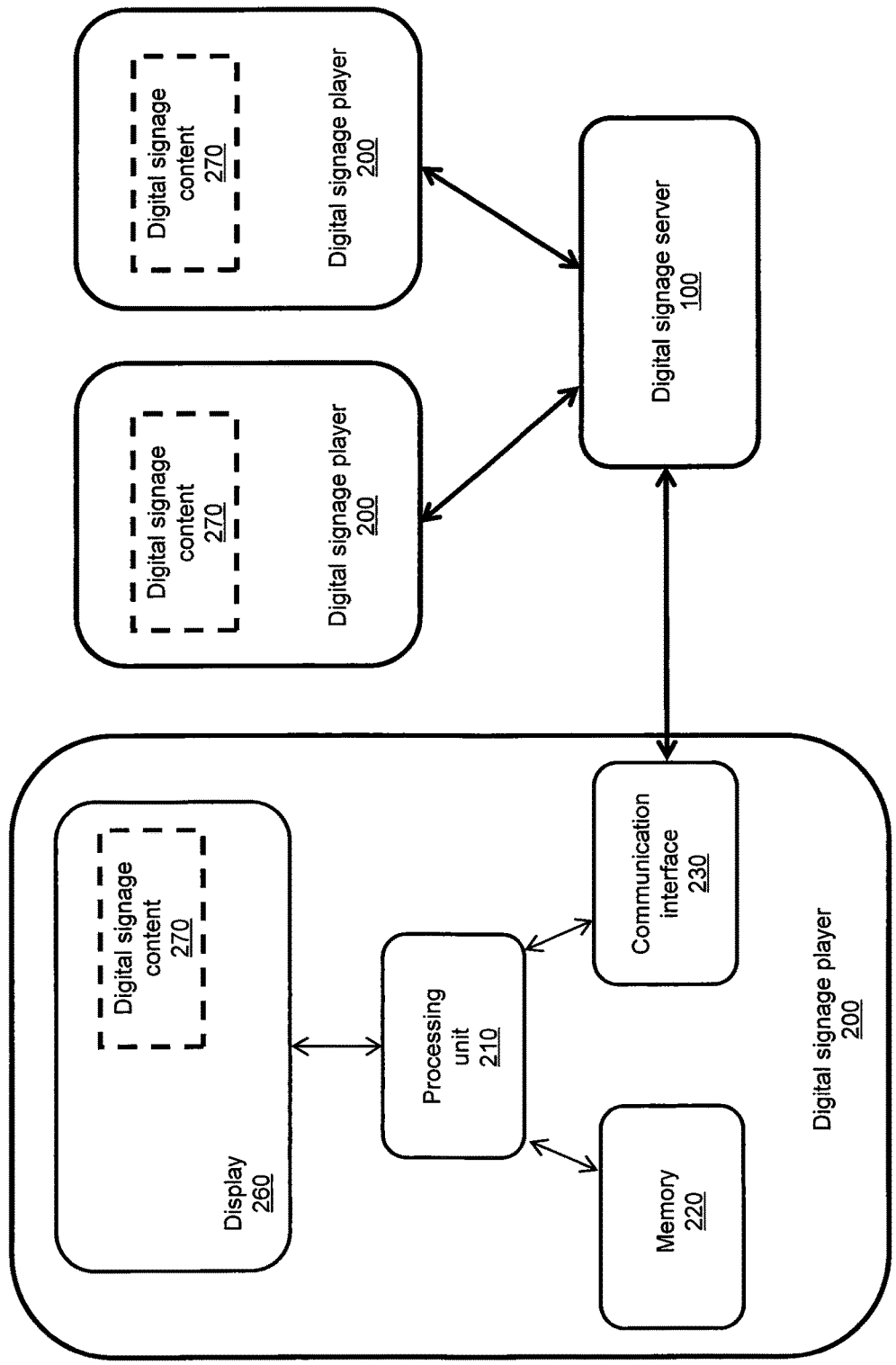
FIG. 1 represents a plurality of digital signage players under the control of a digital signage server.

Referring now to FIG. 1, a digital signage server 100 and a plurality of digital signage players 200 are represented.

In a traditional digital signage infrastructure, the digital signage server 100 controls the digital signage content 270 displayed on the plurality of digital signage players 200. More specifically, the digital signage server 100 determines which digital signage content 270 is displayed on each digital signage player 200, when a digital signage content 270 shall be displayed, how often a digital signage content 270 shall be repeated, at which position of a screen a digital signage content 270 shall be displayed, etc. For this purpose, the digital signage server 100 generates a signage loop to rotate digital signage contents 270 on each digital signage player 200. Each digital signage player 200 receives from the digital signage server 100 its own signage loop, and the digital signage contents 270 referred to in the signage loop. The digital signage player 200 then displays the retrieved digital signage contents 270 in accordance with the signage loop.

The digital signage player 200 is a computing device comprising the following components, illustrated in FIG. 1.

The digital signage player 200 comprises a processing unit 210. The processing unit 210 comprises one or more processors (not represented in FIG. 1) capable of executing instructions of computer program(s) for performing the functionalities of the digital signage player 200 (receiving data, processing the received data, generating data, transmitting the generated data, displaying data on a display 260, etc.). Each processor may further have one or several cores.

The digital signage player 200 comprises memory 220. The memory 220 stores instructions of the computer program(s) executed by the processing unit 210, data generated by the execution of the computer program(s), data received from a communication interface 230, etc. Only a single memory 220 is represented in FIG. 1, but the digital signage player 200 may comprise several types of memories, including volatile memory (such as a volatile Random Access Memory (RAM), etc.) and non-volatile memory (such as a hard drive, electrically-erasable programmable read-only memory (EEPROM), etc.).

Figure 2:
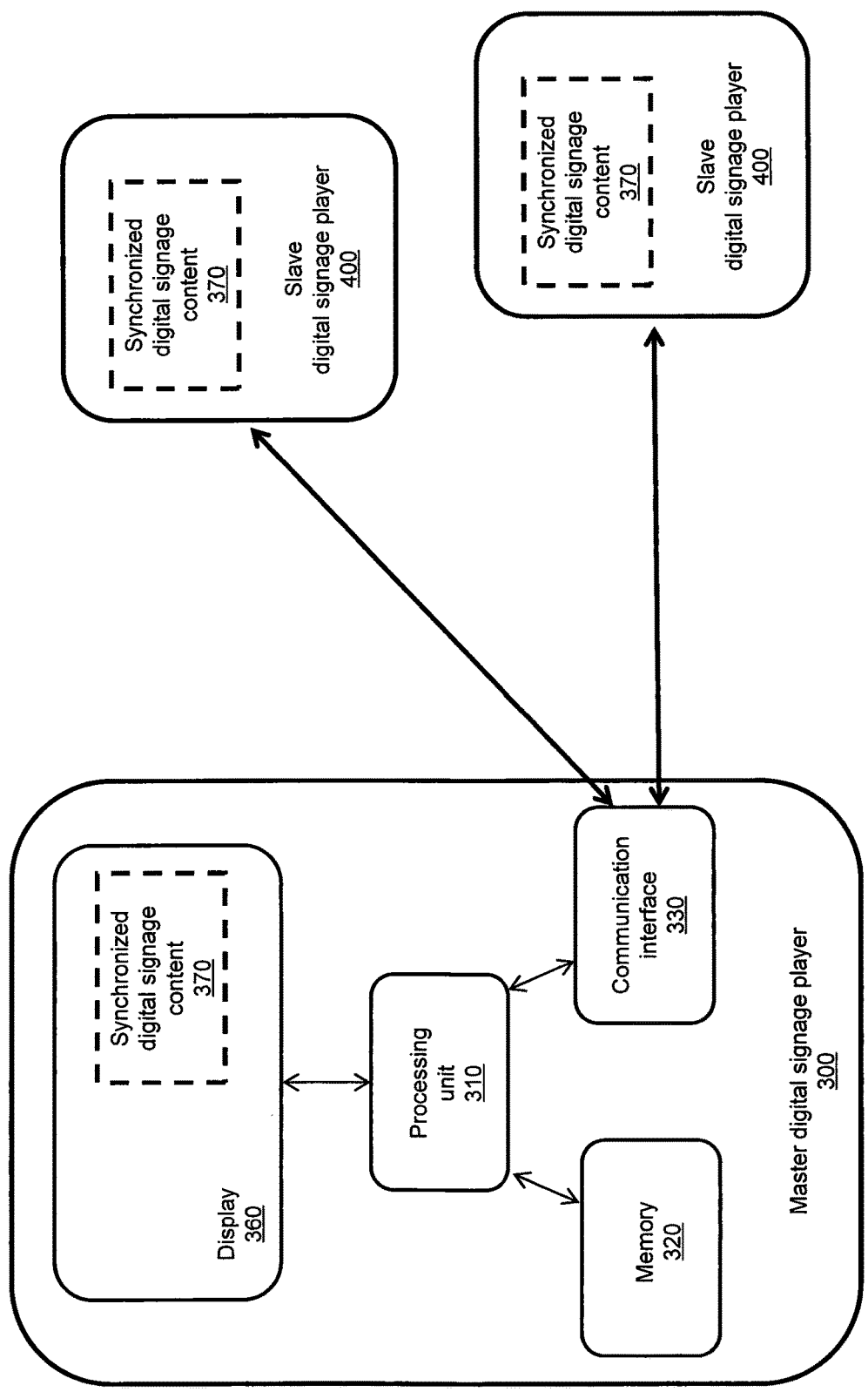
FIG. 2 represents the plurality of digital signage players of FIG. 1 comprising a master player and one or more slave player.

The digital signage player 200 comprises the communication interface 230. The communication interface 230 allows the digital signage player 200 to exchange data with the digital signage server 100, and with other computing devices such as neighbor digital signage players 200 (as illustrated in FIG. 2). For simplification purposes, we refer to a single communication interface 230 capable of supporting one or more of the following communication technologies: fixed broadband, Ethernet, cellular, Wi-Fi, mesh, Bluetooth, etc. For example, the digital signage player 200 communicates with the digital signage server 100 via a cellular network or a fixed broadband network, and communicates with neighbor digital signage players 200 (as illustrated in FIG. 2) via a Wi-Fi network. In this case, the communication interface 230 comprises a cellular communication functionality and a Wi-Fi communication functionality. The communication interface 230 usually comprises a combination of hardware and software executed by the hardware, for implementing the communication functionalities of the communication interface 230.

The digital signage player 200 comprises a display 260. A single display 260 is represented in FIG. 1. However, the digital signage player 200 may comprise several displays 260. Digital signage content is displayed on the one or more display 260. The display 260 consists of, without limitations, a liquid-crystal display (LCD), a light-emitting diode (LED) display, an organic light-emitting diode (OLED) display, a projector screen, a combination thereof, etc. The display 260 may have a large screen, to be visible by a large crowd. The digital signage player 200 is usually located in a public venue (e.g. an airport, a shopping mall, etc.), so that a large number of persons located close to the digital signage player 200 can see a content 270 displayed on its display(s) 260.

The digital signage player 200 may include additional optional components (not represented in FIG. 1), such as a user interface, one or more sensor (e.g. a camera), etc.

The digital signage server 100 is also a computing device comprising the following components: a processing unit, memory, a communication interface, an optional display, an optional user interface, etc. The components of the digital signage server 100 are not represented in FIG. 1 for simplification purposes.

Referring now to FIG. 2, a master digital signage player 300 and a plurality of slave digital signage players 400 are represented. For simplification purposes, the digital signage players will be referred to as players in the rest of the description.

The master player 300 and the slave players 400 correspond to the players 200 represented in FIG. 1. The master player 300 and the slave players 400 are members of a synchronized group of players. The synchronized group comprises one master player and at least one slave player. The synchronized group may include any number of slave players. One player of the synchronized group is selected for being the master player, and the rest of the players of the synchronized group become the slave players.

Within a given geographical area (e.g. an airport, a shopping mall, one or more streets, etc.) where a plurality of players are located, one or more synchronized group of players may be set up. The players of a synchronized group have characteristics in common. Based on these characteristics, the same digital signage content is displayed synchronously on the displays of the players of the synchronized group. For instance, FIG. 2 illustrates the synchronous display of the same digital signage content 370 on the display 360 of the master player 300 and on the displays (not represented in FIG. 2 for simplification purposes) of the slave players 400.

The synchronized display of the same digital signage content is controlled by the master player 300 of a synchronized group, instead of being controlled by the digital signage server 100 represented in FIG. 1. The players of a synchronized group operate all the time under the control of their master player 300. Alternatively, the players of a synchronized group operate only at given moments of time under the control of their master player 300. The rest of the time, the players of a synchronized group operate under the control of the digital signage server 100 represented in FIG. 1. The players of a synchronized group may also operate simultaneously under the control of their master player 300 for synchronized digital signage content and under the control of the digital signage server 100 represented in FIG. 1 for unsynchronized digital signage content. However, in an alternative implementation, the master may be a server such as the digital signage server 100, while the slaves remain the slave players 400.

Although a single synchronized digital signage content 370 is represented in FIG. 2, several independent digital signage contents may be displayed at the same time in a synchronized manner by the master player 300 and the slave players 400.

In order to perform a synchronized display of the digital signage content 370 by the master player 300 and the one or more slave player 400, the digital signage content 370 must be available to the master player 300 and to the one or more slaver players 400. For instance, the digital signage content 370 is downloaded from a central repository and stored at the master player 300 and at the one or more slaver player 400. The digital signage content 370 is downloaded and cached locally rather than being streamed from the central repository to avoid communication problems which may occur between the central repository and some of the players, preventing real time streaming of the digital signage content 370.

In addition to having the digital signage content 370 stored on the players 300 and 400 before displaying it, the players 300 and 400 need to be in operating conditions allowing display of the digital signage content 370 on their respective displays. For example, if one of the players is out of order, the display of the digital signage content 370 cannot be performed. An exhaustive list of all the conditions under which the display of the digital signage content 370 cannot be performed is out of the scope of the present disclosure.

Figure 3:
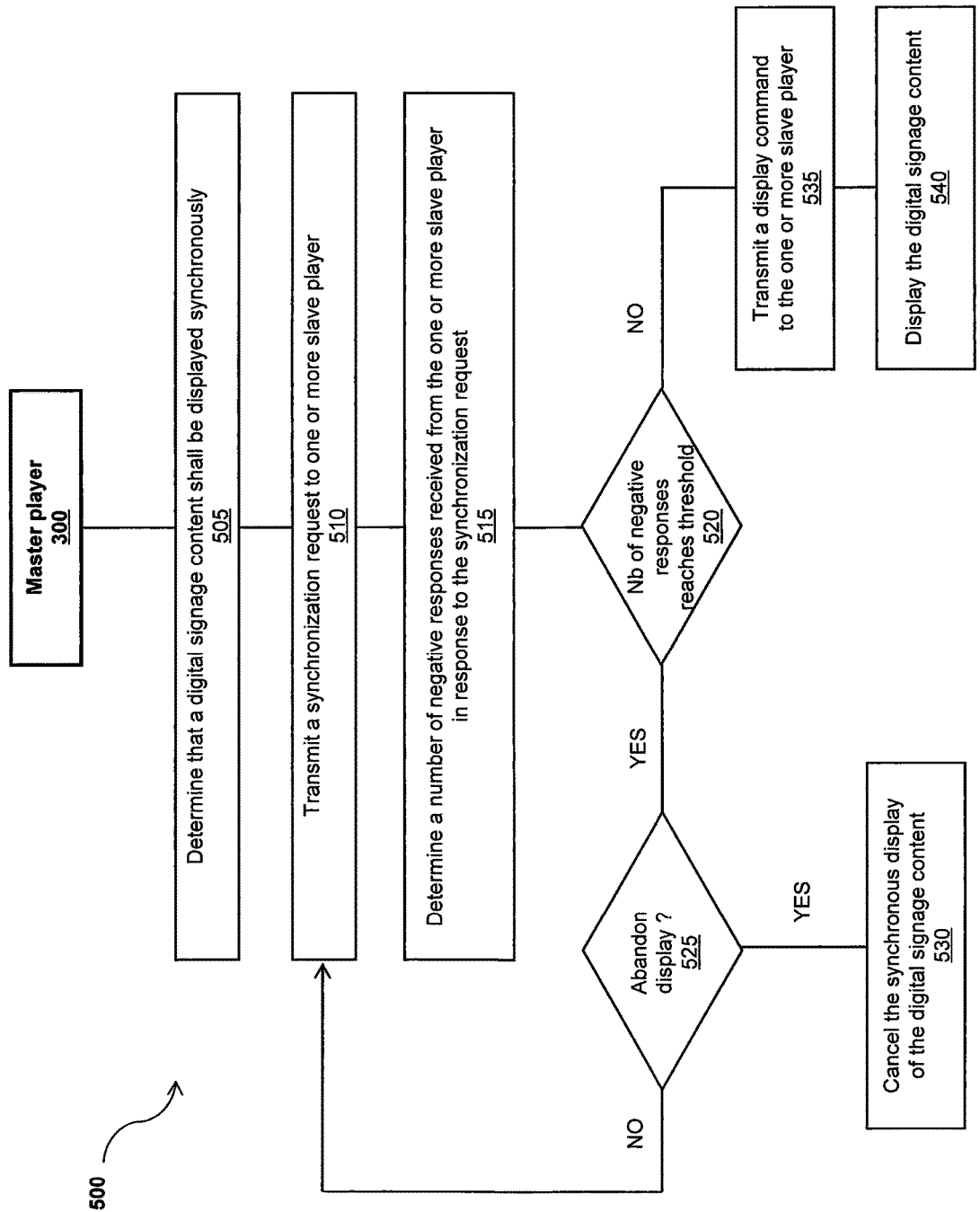
FIG. 3 illustrates a method for synchronizing display of a digital signage content on the master player and on the one or more slave player of FIG. 2.

Referring now concurrently to FIGS. 2 and 3, a method 500 for synchronizing display of the digital signage content 370 on the master player 300 and on one or more slave player 400 is represented in FIG. 3. The method 500 is implemented by the master player 300.

The components (processing unit 310, memory 320, display 360 and communication interface 330) of the master player 300 are identical to the corresponding components (processing unit 210, memory 220, display 260 and communication interface 230) of the player 200 represented in FIG. 1. The components of the slave players 400 are not represented in FIG. 2 for simplification purposes, but are identical to the components of the master player 300. Although two slave players 400 are represented in FIG. 2, the method 500 is applicable to any number of slave player 400 greater or equal to one.

A specific computer program has instructions for implementing the steps of the method 500. The instructions are comprised in a non-transitory computer program product (e.g. the memory 320). The instructions provide for synchronizing display of the digital signage content 370 on the master player 300 and on one or more slave player 400, when executed by the processing unit 310 of the master player 300. The instructions are deliverable via an electronically-readable media, such as a storage media (e.g. a USB key), or via communication links (e.g. a Wi-Fi or cellular network) through the communication interface 330 of the master player 300.

The method 500 comprises the step 505 of determining that the digital signage content 370 shall be displayed synchronously on the display 360 of the master player 300 and on the display of the one or more slave player 400. Step 505 is executed by the processing unit 310 of the master player 300.

A plurality of digital signage content identifiers is stored in the memory 320 of the master player 300. Each digital signage content identifier identifies a corresponding digital signage content. At a given instant, the processing unit 310 determines that the given digital signage content 370 among the plurality of digital signage contents shall be displayed synchronously on the display 360 of the master player 300 and on the display of the one or more slave player 400. The given digital signage content 370 is identified by its identifier. The determination is performed based on one or more criterion. Examples of criteria include a display loop (defining a sequence of digital signage contents to be displayed over time), current audience characteristics of the master player 300 determined statistically and/or in real time, etc.

Before proceeding with step 510 of the method 500, the processing unit 310 checks if the determined digital signage content 370 is present in the memory 320. If it is not present, the processing unit 310 performs the download of the determined digital signage content 370 for storage in the memory 320.

The method 500 comprises the step 510 of transmitting a synchronization request to the one or more slave player 400. Step 510 is executed by the processing unit 310 of the master player 300. The synchronization request is transmitted via the communication interface 330. The synchronization request comprises the digital signage content identifier of the synchronized digital signage content 370 to be displayed. As mentioned previously, the goal of the synchronization request is to determine if the one or more slave player 400 is capable of displaying the digital signage content 370.

The synchronization request is broadcasted. The advantage of broadcasting is that the master player 300 does not need to know how to reach the one or more slave player 400. For instance, if the Internet Protocol (IP) is used, the master player 300 does not need to know the IP address or Domain Name Server (DNS) name of the one or more slave player 400. The broadcast synchronization request is received by all the devices within reach of the broadcast domain. For example, the broadcast synchronization request is transmitted using the User Datagram Protocol (UDP).

As mentioned previously, the master player 300 and the one or more slave player 400 belong to a synchronized group. The synchronized group has a group identifier, to identify the synchronized group and differentiate it from other synchronized groups. The group identifier is stored in the memory 320 of the master player 300 and in the memory of the one or more slave player 400.

The group identifier is included (by the processing unit 310) in the synchronization request. Thus, the one or more slave player 400 receives the synchronization request, and determines that it should process the synchronization request because of the presence of the group identifier in the synchronization request (which matches the group identifier stored in its memory). Similarly, another slave player (not represented in FIG. 2) not belonging to the synchronized group determines that it should not process the synchronization request because of the presence of the group identifier in the synchronization request (which does not match the group identifier stored in its memory).

Alternatively, the multicast technology is used Instead of the broadcast technology. For example, each synchronized group is associated to a corresponding multicast group. The synchronization request is transmitted to the multicast group corresponding to the synchronized group by the master player 300. The one or more slave player 400 joins the multicast group, to receive the multicast synchronization request. For example, the multicast synchronization request is transmitted using the UDP protocol.

Alternatively, the master player 300 stores in the memory 320 a communication identifier (e.g. IP address or DNS name) of the one or more slave player 400. The master player 300 transmits a unicast synchronization request to each one of the slave player 400, using the respective communication identifier(s). For example, the unicast synchronization request is transmitted using the Transmission Control Protocol (TCP).

Other alternatives include a time-based synchronization, where the slave players 400 need to know the IP address of the master player 300; a cloud-based synchronization where the coordination between the master and slaves is based on a cloud service; etc.

The processing of the synchronization request by the one or more slave player 400 will be detailed later in the description.

The method 500 comprises the step 515 of determining a number of negative responses received from the one or more slave player 400 in response to the synchronization request sent at step 510. Each negative response is indicative of one among the one or more slave player 400 not being capable of displaying the digital signage content 370. Step 515 is executed by the processing unit 310 of the master player 300.

The negative response may include the digital signage content identifier of the digital signage content 370. This allows the master player 300 to distinguish between concurrently received negative responses corresponding to different synchronized digital signage contents 370 to be displayed on the master player 300 and the one or more slave player 400.

A slave player 400 sends a negative response if it is not capable of displaying the digital signage content 370, and does not send any response if it is capable of displaying it. For example, if the number of slave players 400 is N, 0 to N negative responses may be received by the master player 300. The master player 300 waits for a given amount of time after sending the synchronization request at step 510, to leave enough time to the one or more slave player 400 to process the synchronization request and send the negative response if applicable. At the end of the given amount of time, the total number of negative responses received by the master player 300 is determined. The given amount of time is stored in the memory 320 and can be configured.

Alternatively, a slave player 400 sends a negative response if it is not capable of displaying the digital signage content 370, and sends a positive response if it is capable of displaying it. For example, the response comprises a flag indicating the capability or incapability of displaying the digital signage content 370. In this case, a response (positive or negative) is expected from each slave player 400. Once the expected response has been received from all the slave players 400, the total number of negative responses received by the master player 300 is determined.

The method 500 comprises the step 520 of determining if the number of negative responses determined at step 515 reaches a threshold. Step 520 is executed by the processing unit 310 of the master player 300. The threshold is stored in the memory 320 and can be reconfigured.

In a first implementation, the threshold evaluated at step 520 is set to one. In this case, if at least one slave player 400 sends a negative response, then the threshold is reached. In another implementation, the threshold evaluated at step 520 is a percentage of the total number of slave players 400 (belonging to the synchronized group). For example, the total number of slave players 400 is 5 and the threshold is set to 25%. In this case, if at least two slave players 400 send a negative response, then the threshold is reached.

If the threshold is reached, then step 525 is executed. Otherwise, step 535 is executed.

The method 500 comprises the step 525 of determining if the display of the digital signage content 370 shall be abandoned or not. Step 525 is executed by the processing unit 310 of the master player 300.

In a first implementation, step 525 consists in determining if a maximum number of synchronization requests is reached (maximum number of iterations of step 510). The maximum number of synchronization requests is stored in the memory 320 and can be reconfigured.

Each time step 510 is performed (for a given synchronized digital signage content 370), the number of transmitted synchronization requests is incremented by one. The number of transmitted synchronization requests is initialized at 0 at step 505. The number of transmitted synchronization requests is compared to the maximum number of synchronization requests at step 525.

If the maximum number of synchronization requests is not reached, the method 500 proceeds to step 510, and a new synchronization request is sent to the one or more slave player 400. Thus, if the maximum number of synchronization requests is N, then a maximum of N iterations of steps 510, 515, 520 and 525 is performed before proceeding to step 530.

If the maximum number of synchronization requests is reached, step 530 is executed.

Step 530 of the method 500 consists in cancelling the synchronous display of the digital signage content 370 on the display 360 of the master player 300 and on the display of the one or more slave player 400. Step 530 is executed by the processing unit 310 of the master player 300.

With respect to the master player 300, step 530 simply consists in terminating the execution of the method 500. The master player 300 may further set a timer for trying to display the synchronized digital signage content 370 later (by re-executing the method 500 later). The master player 300 may also select a new synchronized digital signage content 370 according to step 505, and proceed with applying the method 500 to the new synchronized digital signage content 370.

With respect to the one or more slave player 400, step 530 simply consists in not sending a display command which will be described at step 535 of the method 500.

In a simplified implementation of the method 500, the maximum number of synchronization requests (the maximum number of iterations of step 510) is set to one, and step 525 is omitted. Thus, If the threshold is reached at step 520, step 530 is executed directly.

In another implementation of step 525 of the method 500, the maximum number of synchronization requests (the maximum number of iterations of step 510) is not determined by a pre-defined maximum count, but by a maximum duration. Thus, at step 525, if the maximum duration is not reached, the master player 300 proceeds with a new iteration of step 510. However, if the maximum duration is reached, the master player 300 proceeds with the execution of step 530. The duration is initialized at step 505. In still another implementation of step 525 of the method 500, if the maximum duration is reached, the master player 300 proceeds with the execution of step 535 even if one or more slave player 400 is not capable of displaying the digital signage content 370.

Optionally, before sending the new synchronization request (repeating step 510 with a new request), the master player 300 waits for a pre-defined amount of time after the determination at step 525 has been performed. This pre-defined amount of time allows a slave player(s) 400 which was not capable of displaying the digital signage content 370, to correct the situation and become capable of displaying the digital signage content 370. The pre-defined amount of time is stored in the memory 320 and can be reconfigured.

The pre-defined amount of time may be increased at each iteration. For instance, the pre-defined amount of time is set to 10 seconds for the first new synchronization request sent (second iteration of step 510), the pre-defined amount of time is set to 30 seconds for the second new synchronization request sent (third iteration of step 510), etc.

The method 500 comprises the step 535 of transmitting a display command to the one or more slave player 400, for displaying the digital signage content 370 on the display of the one or more slave player 400. Step 535 is executed by the processing unit 310 of the master player 300. The display command is transmitted via the communication interface 330. The display command comprises the digital signage content identifier of the synchronized digital signage content 370 to be displayed.

As mentioned previously, the display command may be broadcasted, multicasted or unicasted.

The processing of the display command by the one or more slave player 400 will be detailed later in the description.

The method 500 comprises the step 540 of displaying the digital signage content 370 on the display 360 of the master player 300. Step 540 is executed by the processing unit 310 of the master player 300. Substantially at the same time, the digital signage content 370 is displayed on the display of the one or more slave player 400, to provide the synchronous display functionality supported by the method 500.

In order to ensure the synchronous display, the display command may include a time reference for displaying the digital signage content 370. For example, an absolute time reference is used. The digital signage content 370 is displayed on the master player 300 and on the slave player(s) 400 when the absolute time reference is reached. In another example, a relative time reference is used. The digital signage content 370 is displayed on the master player 300 after the relative time reference is elapsed following the sending of the display command. The digital signage content 370 is displayed on the slave player(s) 400 after the relative time reference is elapsed following the reception of the display command.

Alternatively, the digital signage content 370 is displayed on the master player 300 directly after sending of the display command. The digital signage content 370 is displayed on the slave player(s) 400 directly after receiving the display command. The delay for transmitting the display command (over a communication network) is considered negligible and the simultaneous display on the master (300) and slave (400) players is considered substantially synchronous.

Figure 4:
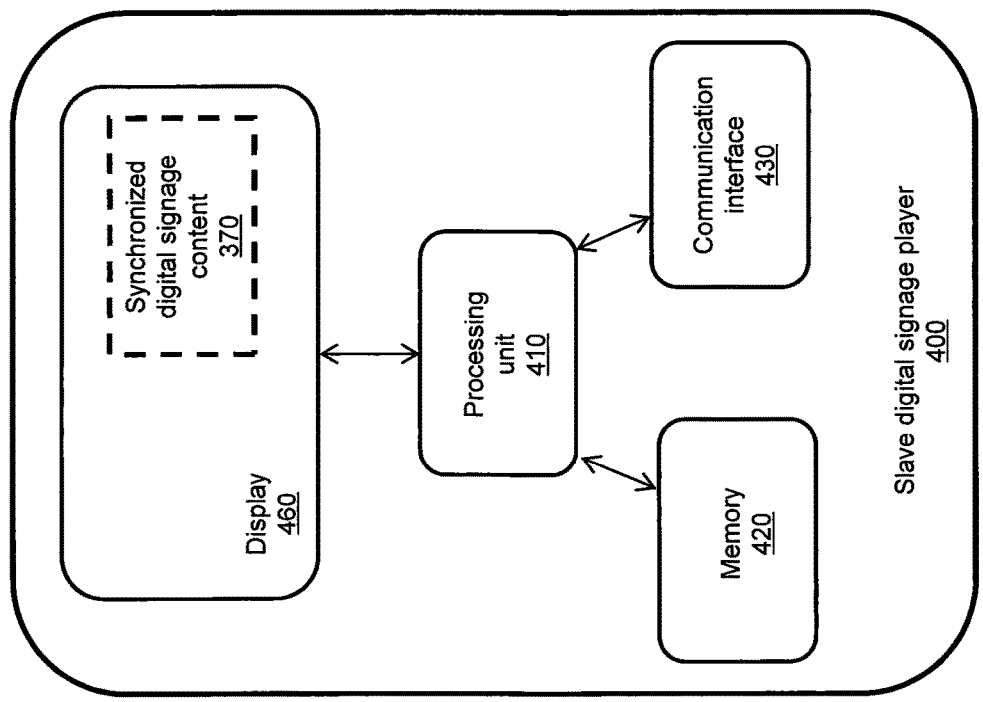
FIG. 4 represents components of the slave player of FIG. 2.
Figure 5:
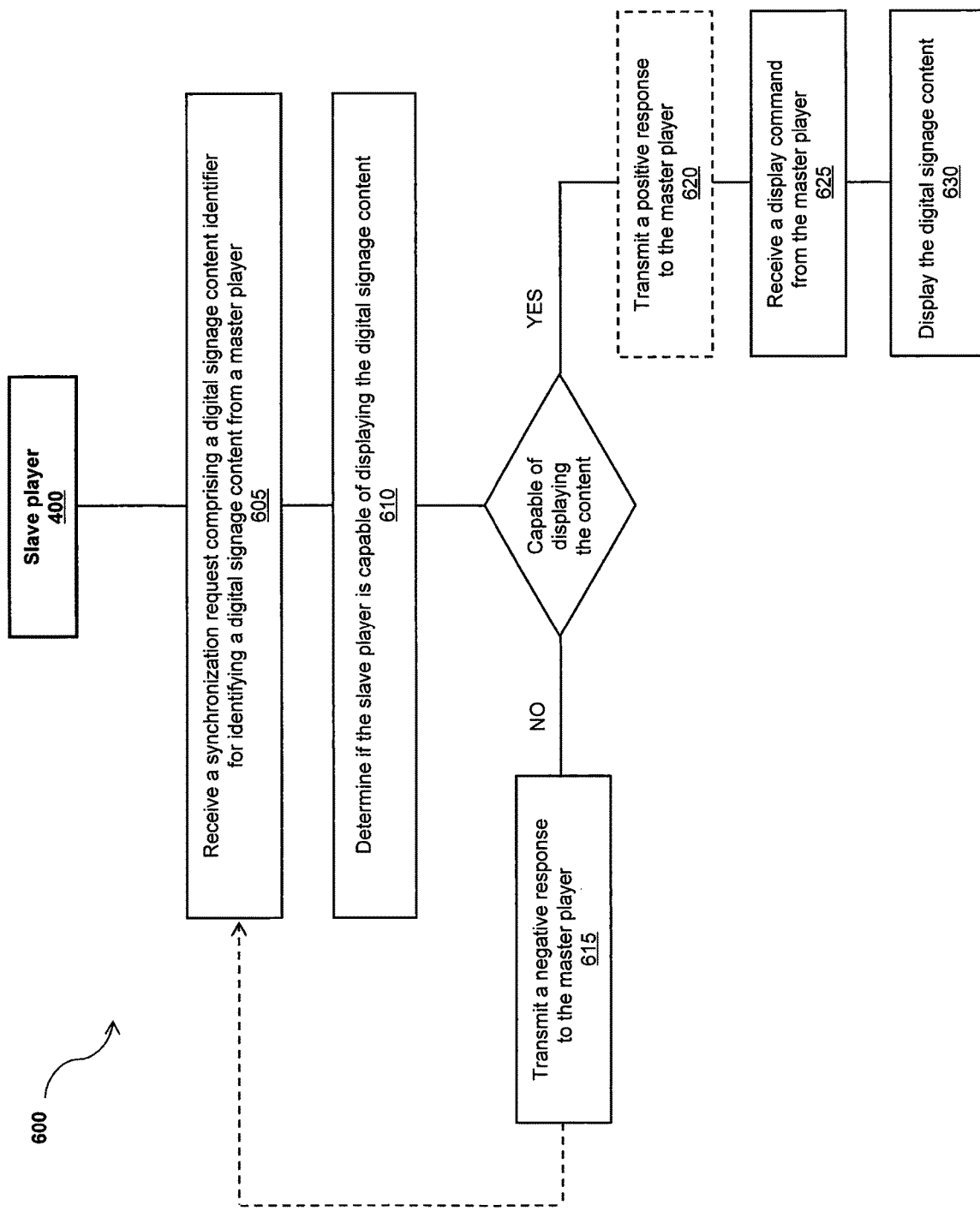
FIG. 5 illustrates a complementary method for synchronizing display of the digital signage content on the master player and on the one of the slave players of FIG. 2.

Referring now concurrently to FIGS. 2, 4 and 5, a method 600 for synchronizing display of the digital signage content 370 on the master player 300 and on one of the slave players 400 is represented in FIG. 5. The method 600 is implemented by each slave player 400 represented in FIG. 2.

FIG. 4 details the components of the slave player 400. The components (processing unit 410, memory 420, display 460 and communication interface 430) of the slave player 400 are identical to the corresponding components (processing unit 210, memory 220, display 260 and communication interface 230) of the player 200 represented in FIG. 1.

A specific computer program has instructions for implementing the steps of the method 600. The instructions are comprised in a non-transitory computer program product (e.g. the memory 420). The instructions provide for synchronizing display of the digital signage content 370 on the master player 300 and the slave player 400, when executed by the processing unit 410 of the slave player 400. The instructions are deliverable via an electronically-readable media, such as a storage media (e.g. a USB key), or via communication links (e.g. a Wi-Fi or cellular network) through the communication interface 430 of the slave player 400.

The method 600 comprises the step 605 of receiving a synchronization request from the master player 300. Step 605 is executed by the processing unit 410 of the slave player 400. The synchronization request is received via the communication interface 430. The synchronization request comprises the digital signage content identifier of the synchronized digital signage content 370 to be displayed. Step 605 corresponds to step 510 of the method 500 represented in FIG. 3.

As mentioned previously, the synchronization request may be broadcasted, multicasted or unicasted.

If the synchronization request is broadcasted, the aforementioned group identifier is included (by the master player 300) in the synchronization request. As mentioned previously, the master player 300 and the slave player 400 belong to a synchronized group identified by the group identifier. The group identifier is stored in the memory 420 of the slave player 400. Upon reception of the synchronization request at step 605, the processing unit 410 of the slave player 400 determines that it should process the synchronization request because of the presence of the group identifier (which matches the group identifier stored in its memory 420). However, upon reception of another synchronization request at step 605, the processing unit 410 of the slave player 400 determines that it should not process the other synchronization request because of the presence of another group identifier (which does not match the group identifier stored in its memory 420).

If the synchronization request is multicasted, the synchronization request is transmitted to a multicast group corresponding to the synchronized group by the master player 300. The slave player 400 joins the multicast group before executing step 605, to be able to receive the multicast synchronization request at step 605.

The method 600 comprises the step 610 of determining if the slave player 400 is capable of displaying the digital signage content 370 (corresponding to the digital signage content identifier included in the synchronization request) on the display 460 of the slave player 400. Step 610 is executed by the processing unit 410 of the slave player 400.

Various circumstances may lead to the determination that the slave player 400 is not capable of displaying the digital signage content 370. Following are a few examples, which are not intended to be limitative.

In a first example, the digital signage content 370 is not stored in the memory 420 of the slave player 400. As mentioned previously, in the context of digital signage, displaying digital signage content stored in the memory 420 is preferred to streaming the digital signage content from a remote server without storage in the memory 420. The digital signage content 370 is not stored in the memory 420 because the digital signage content 370 has not been downloaded yet from a remote server. Alternatively, the digital signage content 370 was previously downloaded from a remote server and stored in the memory 420. However, the digital signage content 370 has been erased from the memory 420, has been corrupted, etc. In any of these cases, the processing unit 410 of the slave player 400 initiates a download of the digital signage content 370 following step 615 and stores the downloaded digital signage content 370 in the memory 420.

In a second example, the display 460 of the slave player 400 is not operational and does not allow display of the digital signage content 370. In this case, the processing unit 410 of the slave player 400 initiates a procedure to reset the display 460 to an operational state.

In a third example, the slave player 400 already has scheduled digital signage content to display on the display 460 and cannot cancel/interrupt the display of the scheduled digital signage content for displaying the digital signage content 370.

The method 600 comprises the step 615 of transmitting a negative response (indicative of the slave player 400 not being capable of displaying the digital signage content 370) to the master player 300. Step 615 is executed by the processing unit 410 of the slave player 400. The negative response is transmitted via the communication interface 430. Step 615 corresponds to step 515 of the method 500 represented in FIG. 3.

As mentioned previously, the negative response may include the digital signage content identifier of the digital signage content 370. This allows the master player 300 to distinguish between concurrently received negative responses corresponding to different synchronized digital signage contents 370 to be displayed on the master player 300 and the one or more slave player 400.

As mentioned previously, the slave player 400 sends a negative response (step 615) if it is not capable of displaying the digital signage content 370, and does not send any response if it is capable of displaying it. Alternatively, the slave player 400 sends a negative response (step 615) if it is not capable of displaying the digital signage content 370, and sends a positive response (optional step 620) if it is capable of displaying it. For example, the response comprises a flag indicating the capability or incapability of displaying the digital signage content 370.

Following step 615, step 605 may be performed again and a new synchronization request is received from the master player 300. As mentioned previously, the master player 300 sends up to a maximum number of consecutive synchronization requests, and consequently the slave player 400 receives up to the maximum number of consecutive synchronization requests. This procedure has been detailed previously when describing the steps (more specifically step 525) of the method 500 illustrated in FIG. 3. Thus, several iterations of steps 605, 610 and 615 may occur. The maximum number of iterations corresponds to the maximum number of consecutive synchronization requests sent by the master player 300.

For example, when a first synchronization request is received at step 605, it is determined at step 610 that the slave player 400 is not capable of displaying the digital signage content 370 and a first negative response is sent at step 615. When a second synchronization request is received at step 605, it is determined at step 610 that the slave player 400 is now capable of displaying the digital signage content 370 and the method 600 proceeds to optional step 625 or to step 630. Alternatively, when the second synchronization request is received at step 605, it is determined at step 610 that the slave player 400 is still not capable of displaying the digital signage content 370 and a second negative response is sent at step 615. This iterative procedure ends either when it is determined at step 610 that the slave player 400 is capable of displaying the digital signage content 370 or when the maximum number of consecutive synchronization requests is reached.

The method 600 comprises the optional step 620 of transmitting the positive response (indicative of the slave player 400 being capable of displaying the digital signage content 370) to the master player 300. Step 620 is executed by the processing unit 410 of the slave player 400. The positive response is transmitted via the communication interface 430. As mentioned previously, step 620 is executed if the determination at step 610 is positive.

The method 600 comprises the step 625 of receiving a display command from the master player 300, for displaying the digital signage content 370 on the display 460 of the slave player 400. Step 625 is executed by the processing unit 410 of the slave player 400. The display command is received via the communication interface 430. The display command comprises the digital signage content identifier of the synchronized digital signage content 370 to be displayed. Step 625 corresponds to step 535 of the method 500 represented in FIG. 3.

As mentioned previously, the display command may be broadcasted, multicasted or unicasted.

The method 600 comprises the step 630 of displaying the digital signage content 370 on the display 460 of the slave player 400. Step 630 is executed by the processing unit 410 of the slave player 400. Substantially at the same time, the digital signage content 370 is displayed on the display 360 of the master player 300, to provide the synchronous display functionality supported by the method 600.

As mentioned previously, in order to ensure the synchronous display on the master (300) and slave (400) players, the display command may include a time reference (an absolute or a relative time reference). In this case, the display of the digital signage content 370 on the display 460 at step 630 is performed after the execution of step 625 with a timing in accordance with the time reference.

Alternatively, the digital signage content 370 is displayed on the display 460 (step 630) directly after receiving the display command at step 625.

The method 500 illustrated in FIG. 3 and the method 600 illustrated in FIG. 5 are not limited to the field of digital signage. These methods apply more generally to the synchronized display of a digital content (e.g. a video, a still image, etc.) on a master computing device (corresponding to the aforementioned master player 300) and on one or more slave computing device (corresponding to the aforementioned slave player 400).

Figure 6:
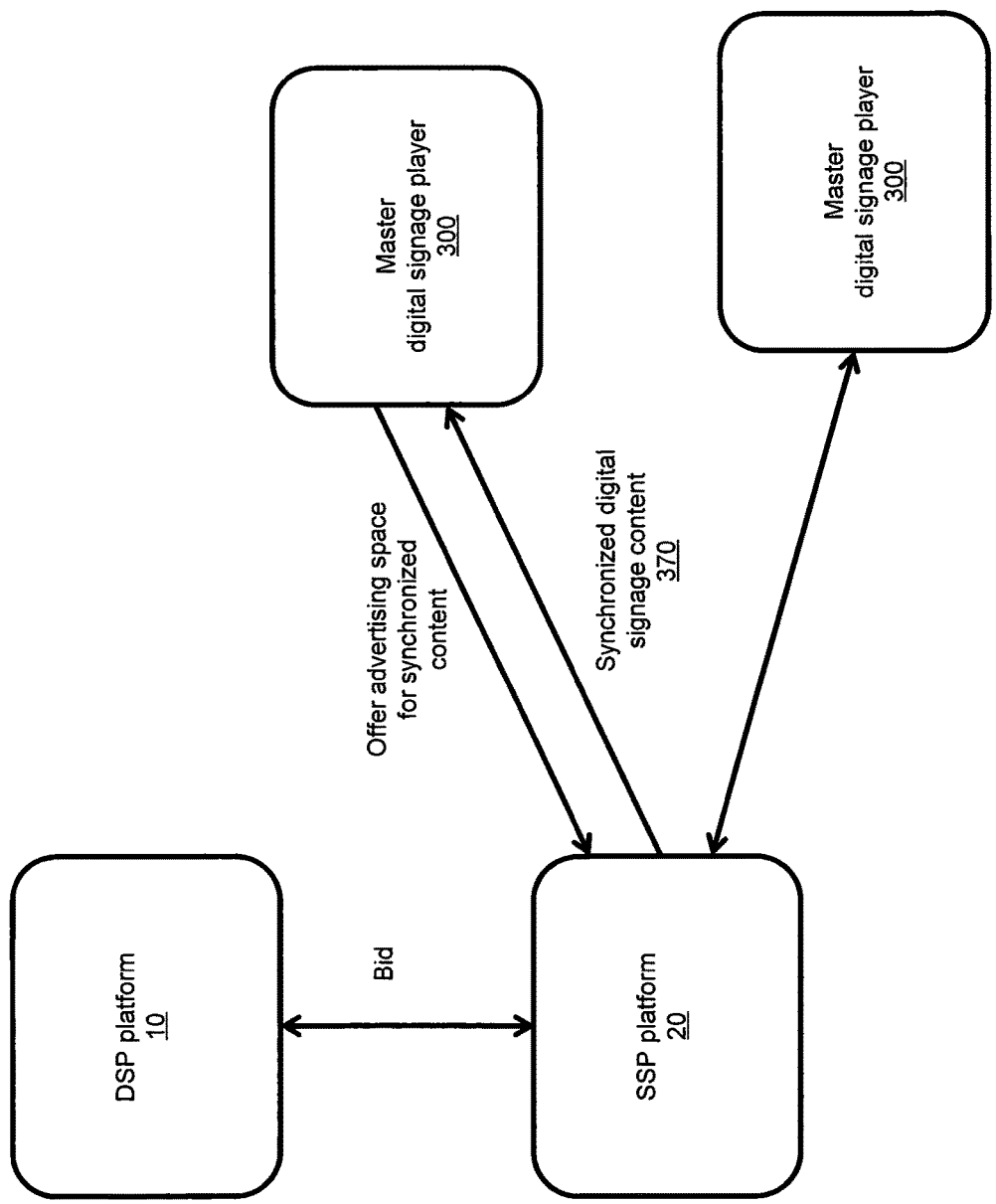
FIG. 6 illustrates an architecture allowing the master player of FIG. 2 to offer advertising space for displaying synchronized digital signage content.

Referring now concurrently to FIGS. 2 and 6, an architecture allowing master players 300 to offer advertising space for synchronized digital signage content 370 is illustrated. Two master players 300 are represented in FIG. 6, but any number of master players 300 may be interacting with a supply-side platform (SSP) 20.

The SSP 20 is well known in the art of advertising. It allows publishers to automate the selling of their advertising space or inventory. The SSP 20 is designed to allow the publishers to maximize the price at which they sell their advertising space or inventory. Each master player 300 can be considered as an independent publisher selling advertising space via the SSP 20.

As mentioned previously, each master player 300 controls a synchronized group comprising the master player 300 and one or more slave player 400 (not represented in FIG. 6 for simplification purposes). The grouping is based on a predicted common audience of the master player 300 and the one or more slave player 400. The predicted audience is determined based on static audience characteristics of the players (e.g. location of the players, proximity of the players with respect to one another, expected profile of the viewers, etc.). A group is constituted of players having common audience characteristics. An election process is used for determining a master player among the group of players, the rest of the players being the slave player(s). The audience characteristics of the players can also be determined at least partially dynamically, using one or more sensors on the players (e.g. cameras for determining persons coming closer to/moving away from a player, etc.). The grouping is dynamic and can evolve over time, following a corresponding evolution of the audience characteristics of the players. Furthermore, a mechanism is implemented for allowing one of the slave players 400 to take over the role of master player for the group, should the elected master player 300 becoming unavailable. For example, a backup master player is selected in advance among the slave players 400 for taking over if required. Alternatively, the selection of a new master player is performed only upon effective failure of the master player 400. A heartbeat protocol can be used for regularly checking that the master player 400 is up and running.

Each synchronized group is characterized by parameters which are common to the master player 300 and the one or more slave player 400. Examples of parameters include the predicted audience of the synchronized group (for example a number of persons in front of the displays of the players), a geometry of the displays of the players, a latitude and longitude of the players, etc. The parameters of the synchronized group are transmitted by the master player 300 to the SSP 20 process, to perform a bidding process for the advertising space available for the synchronized group. During the bidding process, the SSP 20 determines (based on the transmitted parameters) the synchronized digital signage content(s) 370 to be displayed simultaneously on the master player 300 and the one or more slave player 400 of the synchronized group. The determined synchronized digital signage content(s) 370 is downloaded by the master player 300 and the one or more slave player 400 before the synchronous display effectively takes place. The master player 400 is in charge of coordinating the digital signage content(s) 370 delivery to the slave players 400.

The demand-side platform (DSP) 10 represented in FIG. 6 is a counterpart of the SSP 20. It allows advertisers to buy impressions from a plurality of publishers. In FIG. 6, the SSP 20 is the intermediation platform between advertisers represented by the DSP 10 and the master players 300. The DSP 10 has a plurality of digital signage contents to play and the master players 300 have advertising space available for playing the digital signage contents. The SSP 20 selects which digital signage content 370 is adapted to a given master player 300, based on the parameters of the synchronized group represented by the given master player 300.

Figure 7:
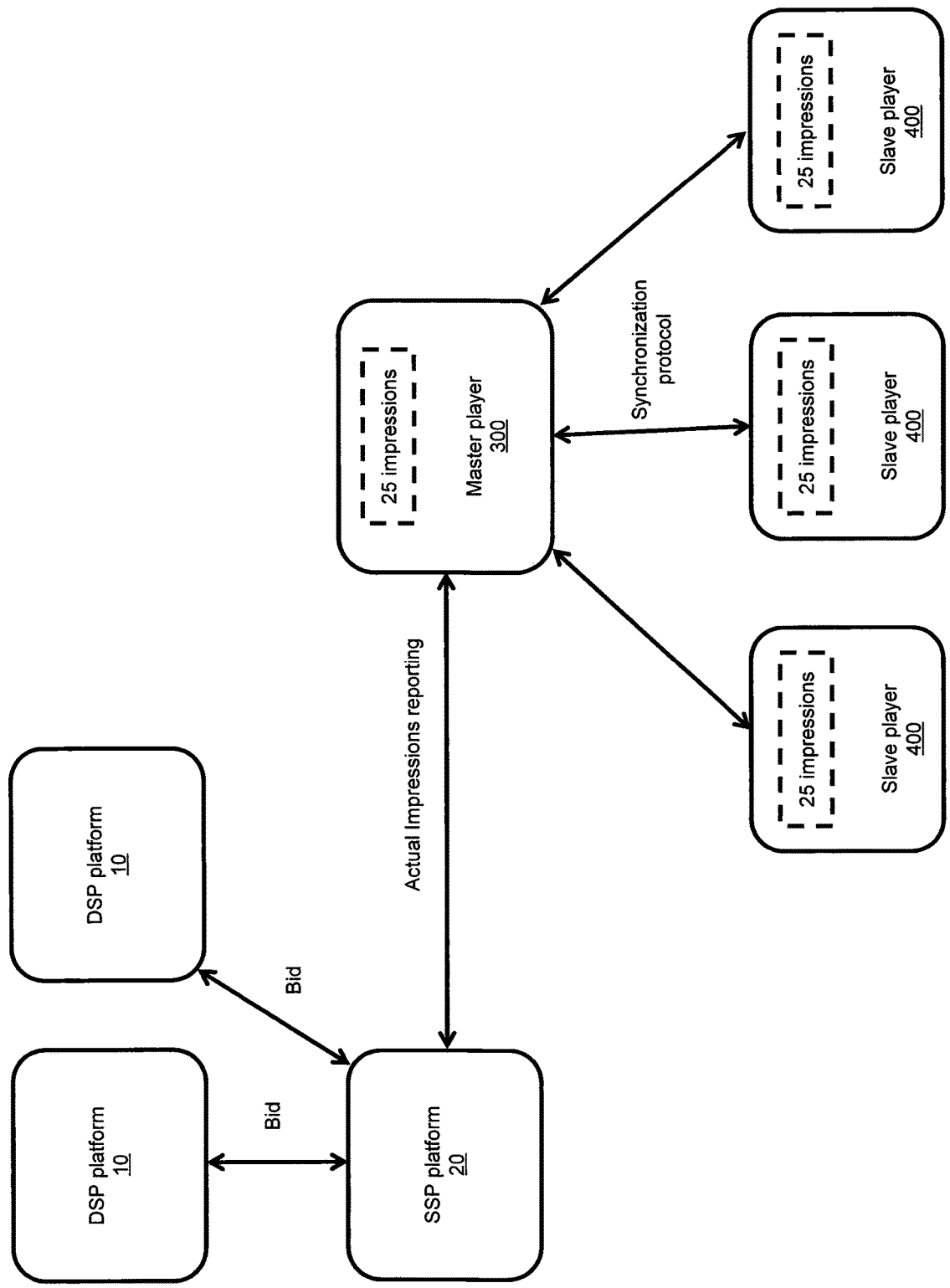
FIG. 7 illustrates the architecture of FIG. 6 adapted for allowing the master player to report actual impressions.

Determination of an Actual Number of Impressions for a Synchronized Group of Players Reference is now made concurrently to FIGS. 2, 4 and 7, where FIG. 7 represents an adaptation of the architectures represented in FIGS. 2 and 6.

The master player 300 of FIG. 7 has three slave players 400 under its control. The master player 300 and the slave players 400 correspond to the players represented in FIGS. 2 and 4. The master player 300 and the slave players 400 are members of a synchronized group of players. For illustration purposes only, the synchronized group corresponding to FIG. 7 comprises the master player 300 and the three slave players 400 (however, a synchronized group may comprise any number of slave players under the control of a master player). The master player 300 is adapted for controlling the synchronously display of one or more digital signage content on the display 360 of the master player 300 and on the displays 460 of the slave players 400. The displays 360 and 460 are not represented in FIG. 7 for simplification purposes.

Some of the mechanisms related to the method 500 (illustrated in FIGS. 2 and 3) and the method 600 (illustrated in FIGS. 2, 4 and 5) are adapted to provide the functionality of determining an actual number of impressions provided by the master player 300 and slave player(s) 400. The notion of actual number will be detailed later in the description and is used in contrast to a nominal number of impressions provided by the master player 300 and slave player(s) 400.

The notion of impression is well known in the art of digital signage. For a given content, the number of impressions for this given content is the number of persons exposed to the given content when it is displayed on a display of a digital signage player. The number of impressions is specific to a given digital signage player and depends on characteristics of the player (e.g. the localization of the player), on a particular time when the given content is displayed, etc. The number of impressions provided by a digital signage player can be measured or estimated based on criteria comprising the characteristics of the digital signage player.

As mentioned in relation to FIG. 6, the SSP platform 20 is an intermediate between the master player 300 and the DSP platform 10. The SSP platform 20 controls a bidding process, where one or more DSP platform 10 bids for an advertising space managed by the master player 300. In the present case, the advertising space consists of the capacity provided by the synchronized group (to display synchronized content on the displays of the master player 300 and three slave players 400).

The displays of the master player 300 and slave players 400 are respectively configured to provide a given number of impressions (for example 25 as represented in FIG. 7 for illustration purposes only). Thus, the combined capacity in terms of impressions of the synchronized group is 25+3*25=100 impressions. This combined capacity will be referred to as the nominal number of impressions provided by the master player 300 and the slave player(s) 400. This nominal number of impressions is achieved when all the displays of the synchronized group are capable of displaying a digital signage content.

The combined capacity of the synchronized group (e.g. a nominal number of 100 impressions) is a parameter used by the SSP platform 20 to control the bidding process of the DSP platforms 10. For example, a first DSP platform 10 offers 1$ per impression and a second DSP platform 10 offers 1.5 $ per impression. In this case, the second DSP platform 10 wins the bid and is granted the capability to display a synchronized digital signage content on the displays of master player 300 and three slave players 400.

As mentioned previously in relation to FIG. 6, the number of impressions is not the only parameter taken into consideration by a DSP platform 10 during the bidding process, but is usually combined with one or more additional parameter (e.g. audience characteristics of the synchronized group).

The second DSP platform 10 having won the bid is charged 150$ for the 100 impressions. Thus, the second DSP platform 10 expects to have the combined capacity of 100 impressions for its synchronized digital signage content. However, if one of the slave players 400 is not capable of displaying the synchronized digital signage content, the effective combined capacity is only 75 impressions. If two of the slave players 400 are not capable of displaying the synchronized digital signage content, the effective combined capacity is only 50 impressions. The effective combined capacity is referred to as the actual number of impressions provided by the master player 300 and the slave player(s) 400.

Various circumstances where a determination is made, that one of the slave players 400 is not capable of displaying the synchronized digital signage content, have been described previously in relation to step 610 of the method 600 represented in FIG. 5.

An advertiser having paid for a nominal number of impressions (e.g. 100) needs to know the actual number of impressions which have taken place, to be aware when the actual number of impressions is lower (e.g. 75 or 50) than the nominal number of impressions (e.g. 100). This process is well known in the art of digital signage and is referred to as proof of play. In the current digital signage infrastructures, proof of play is usually based on display logs collected by the master player 300 and slave players 400. However, the display logs may be processed every day, every week, everything month, etc. Therefore, the moment when a disruption between the nominal number of impressions and the actual number of impressions is detected and reported to the SSP platform 20 occurs well after the occurrence of the disruption. The present disclosure aims at providing a new mechanism for detecting and reporting such disruptions faster.

The new mechanism for detecting and reporting such disruptions can also be used to improve the bidding process, by allowing the bidding process to be based on an actual number of impressions available (e.g. only 75) instead of the nominal number of impressions available (e.g. 100). For instance, referring to the previous example, if the second DSP platform 10 had known that the number of impressions available for the synchronized group is the actual number 75 instead of the nominal number 100, it may have offered 0.75 $ instead of 1.5 $ per impression. In this case, the first DSP platform 10 would have won the bid with its offer of 1$ per impression (instead of the second DSP platform 10 winning as previously described).

Referring now to FIGS. 3 and 7, the new mechanism can be integrated to the method 500 for improving the proof of play process. At step 535, when a display command is transmitted to the slave players 400, the number of slave players 400 capable of displaying the synchronized digital signage content has been determined based on step 515. If the number of slave players 400 is N and the number of negative responses received at step 515 is R, then the number of displays in the synchronized group capable of displaying the content is N+1 (taking into consideration the display of the master player 300)−R. If each display provides the same number of impressions I (e.g. 25 as illustrated in FIG. 7), then the nominal number of impressions is I*(N+1), and the actual number of impressions determined when step 535 is performed is I*(N+1−R).

Some of the steps of the method 500 can also be used for improving the bidding process. For instance, by performing steps 510 and 515, the actual number of available impressions I*(N+1−R) can be determined at any time and used by the SSP platform 20 to perform a more accurate bidding process (using the actual number of available impressions instead of the nominal number of available impressions).

In the following, a new method will be described for implementing the new mechanism. This method is disclosed independently of the method 500, to focus on the specificities of the new mechanism allowing to improve both the proof of play process and the bidding process.

Figure 8:
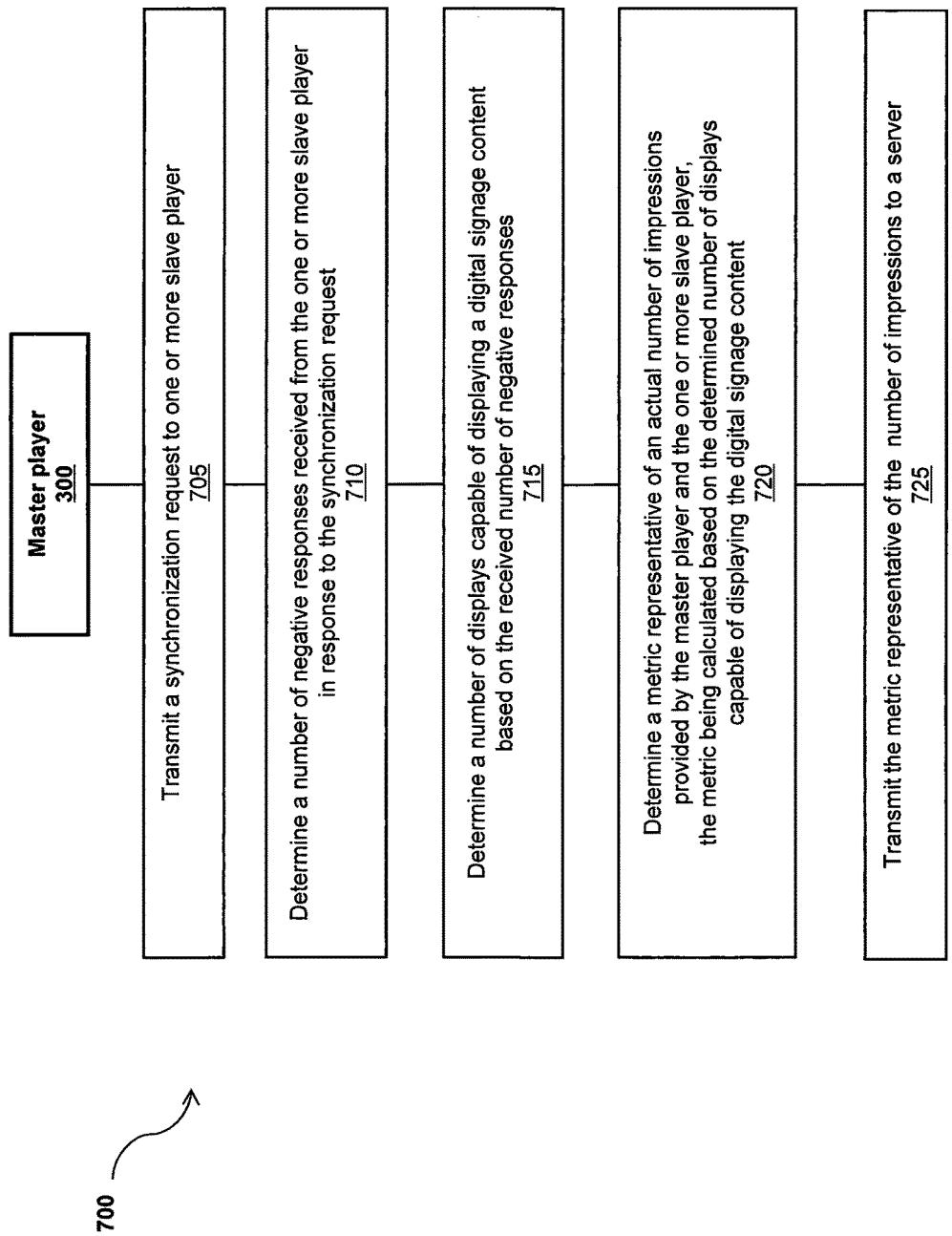
FIG. 8 illustrates a method for determining an actual number of impressions provided by a synchronized group of devices comprising the master player and the slave players of FIG. 7.
Figure 9:
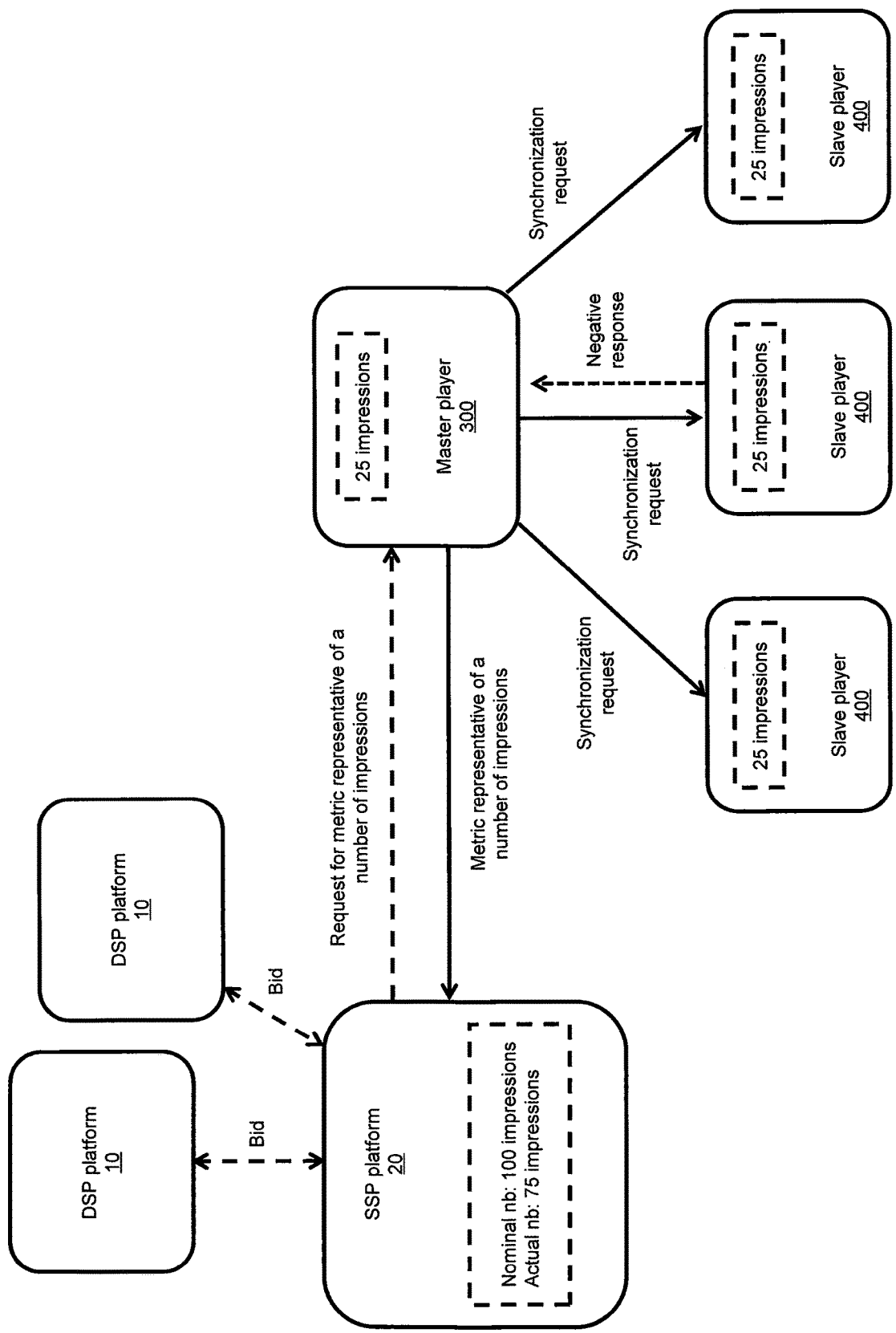
FIG. 9 illustrates the implementation of the method of FIG. 8 with the architecture of FIG. 7.

Referring now to FIGS. 2, 4, 5, 8 and 9, a method 700 for determining an actual number of impressions provided by the master player 300 and the one or more slave player 400 is illustrated in FIG. 8. FIG. 9 represents the components of the architecture of FIG. 7 involved in the method 700. The method 700 is implemented by the master player 300.

A specific computer program has instructions for implementing the steps of the method 700. The instructions are comprised in a non-transitory computer program product (e.g. stored in the memory 320 of the master player 300). The instructions provide for determining an actual number of impressions provided by the master player 300 and the one or more slave player 400, when executed by the processing unit 310 of the master player 300. The instructions are deliverable via an electronically-readable media, such as a storage media (e.g. a USB key), or via communication links (e.g. a Wi-Fi or cellular network) through the communication interface 330 of the master player 300.

The method 700 comprises the step 705 of transmitting a synchronization request to the one or more slave player 400. Step 705 is executed by the processing unit 310 of the master player 300. The synchronization request is transmitted via the communication interface 330 of the master player 300.

FIG. 9 illustrates the case where the synchronized group comprises three slave players 400 and the synchronization request is sent to the three slave players 400 of the synchronized group. However, as mentioned previously, the method 700 is applicable to a synchronized group comprising any number of slave players 400 (one or more).

The method 700 comprises the step 710 of determining a number of negative responses received from the one or more slave player 400 in response to the synchronization request. Each negative response is indicative of one among the one or more slave player 400 not being capable of displaying a digital signage content on its display 460. Step 710 is executed by the processing unit 310 of the master player 300. Each negative response is received via the communication interface 330 of the master player 300.

As mentioned previously, the number of slave player(s) 400 belonging to the synchronized group controlled by the master player 300 is referred to as N, where N is an integer greater or equal than 1. The number of negative responses received at step 710 is referred to as R, where R is an integer comprised between 0 and N. FIG. 9 illustrates an exemplary use case where N=3 and R=1.

The method 700 comprises the step 715 of determining a number of displays capable of displaying a digital signage content based on the number of negative responses R received at step 710. Step 715 is executed by the processing unit 310 of the master player 300. The number of displays capable of displaying a digital signage content is referred to as D. D is equal to N+1−R if the display 360 of the master player 300 is capable of displaying a digital signage content. FIG. 9 illustrates an exemplary use case where D=3+1−1=3.

It may happen that the display 360 of the master player 300 is not capable of displaying a digital signage content. In this case, the number of displays D calculated at step 715 does not include the display 360 of the master player 300 and is equal to N−R.

The method 700 comprises the step 720 of determining a metric representative of the actual number of impressions provided by the master player 300 and the slave player(s) 400. The metric is calculated based on the number of displays D capable of displaying a digital signage content (determined at step 715). Step 720 is executed by the processing unit 310 of the master player 300. The metric is referred to as M and examples of the determination of the metric M will be provided later in the description.

The method 700 comprises the step 725 of transmitting the metric M representative of the actual number of impressions (determined at step 720) to the SSP platform 20. Step 725 is executed by the processing unit 310 of the master player 300 and the transmission is made via the communication interface 330 of the master player 300.

Although not represented in FIG. 9 for simplification purposes, the SSP platform 20 comprises at least one processor for processing and generating data, memory for storing data, and a communication interface for exchanging data with the master player 300.

As illustrated in FIG. 9, the SSP platform stores the nominal number of impressions. As mentioned previously, the nominal number of impressions corresponds to the case where the display 360 of the master player 300 and the display(s) 460 of the slave player(s) 400 are all available for displaying a digital signage content. The SSP platform 20 also stores the actual number of impressions. The actual number of impressions is updated via the execution of the method 700 and takes into account display(s) not available for displaying a digital signage content. The value of the actual number of impressions is calculated based on the value of the metric M (transmitted at step 725).

The value of the metric M depends on information available at the SSP platform 20 for calculating the actual number of impressions. The SSP platform 20 is configured with this information. The configuration of the SSP platform 20 with this information is out of the scope of the present disclosure. For example, the SSP platform 20 sends a request for this information to the master player 300 and the master player 300 sends the requested information.

In the following, it is assumed that each display belonging to the synchronized group (display 360 of the master player 300 and displays 460 of the slave players 400) has the same number of impressions I.

In a first implementation, the SSP platform 20 is configured with the number of impressions per display I for the synchronized group. In this case, the metric M is equal to the number of displays D capable of displaying a digital signage content (determined at step 715). The actual number of impressions calculated by the SSP platform 20 is equal to M*I. In the example illustrated in FIG. 9, M=3 and I=25. The actual number of impressions is equal to 3*25=75.

In a second implementation, in addition to the number of impressions per display I for the synchronized group, the SSP platform 20 is also configured with the total number of displays of the synchronized group: N+1. In this case, the metric M is the percentage of displays of the synchronized group capable of displaying a digital signage content, which is proportional to D/(N+1). M may be expressed as a percentage (e.g. 75%) or a real number (e.g. 0.75). The actual number of impressions calculated by the SSP platform 20 is equal to M*(N+1)*I. In the example illustrated in FIG. 9, N+1=4, M=75% and I=25. The actual number of impressions is equal to 0.75*4*25=75.

In a third implementation, the SSP platform 20 is not configured with information allowing the calculation of the actual number of impressions. In this case, the metric M is directly equal to the actual number of impressions. The number of impressions per display I for the synchronized group is stored in the memory 320 of the master player 300. The master player 300 has all the information needed (D and I) for calculating the actual number of impressions M=D*I. In the example illustrated in FIG. 9, D=3 and I=25. The actual number of impressions M is equal to 3*25=75. The SSP platform 20 directly receives the actual number of impressions M.

In the case where the displays belonging to the synchronized group (master player 300 and slave players 400) do not have the same number of impressions, an average number of impressions per display can be used for the value of I. For example, the displays of the master player 300 and slave players 400 represented in FIG. 9 have respective impressions of 30, 20, 20 and 30 (instead of 25 for each of them). The value of I is set to the average value of 30, 20, 20 and 30 which is 25. The calculation of the metric M and actual number of impressions mentioned in the three previous implementations is applicable to this use case. However, the actual number of impressions calculated by the SSP platform 20 is only an approximation. For example, if a display with 20 impressions cannot display digital signage content, the actual number of impressions calculated based on the average value I=25 is 75 while the real number of impressions is 80. The usage of the average number of impressions per display provides a good approximation for the actual number of impressions when the number of impressions of the displays of the master player 300 and slave players 400 are not too different.

In the case where the displays belonging to the synchronized group (master player 300 and slave players 400) do not have the same number of impressions, and the previously described average number of impressions per display is not used, the method 700 needs to be adapted.

An adaptation of the previously mentioned third implementation will now be provided. A number of impressions for the display 460 of each slave player 400 is stored in the memory 320 of the master player 300, along with respective unique identifiers of the slave players 400 (e.g. Internet Protocol (IP address) or Media Access Control (MAC) address). The number of impressions for the display 360 of the master player 300 is also stored in the memory 320.

For example, referring to FIG. 9, the number of impressions for the display 360 of the master player 300 is $I_0$ (e.g. 20). The number of impressions for the display 460 of the first slave player 400 is $I_1$ (e.g. 30) and its unique identifier is $ID_1$. The number of impressions for the display 460 of the second slave player 400 is $I_2$ (e.g. 30) and its unique identifier is $ID_2$. The number of impressions for the display 460 of the third slave player 400 is $I_3$ (e.g. 20) and its unique identifier is $ID_3$.

Steps 710 of the method 700 is adapted as follows. A negative response sent by a given slave player 400 not capable of displaying a digital signage content contains the unique identifier of the given slave player 400. Step 710 consists in extracting the unique identifier(s) comprised in the received negative response(s).

Steps 715 of the method 700 is not performed and step 720 is adapted as follows. The metric M consists of the actual number of impressions calculated by adding the number of impressions per display stored in the memory 320, excluding each number of impression corresponding to a display 460 for which the unique identifier has been received at step 710 (and further excluding the number of impression corresponding to the display 360 of the master player 300 if applicable).

In a first example, a negative response with the identifier $I_1$ is received at step 710. The metric M calculated at step 715 is equal to $I_0+I_2+I_3=20+30+20=70$. In a second example, a negative response with the identifier $I_3$ is received at step 710. The metric M calculated at step 715 is equal to $I_0+I_1+I_2=20+30+30=80$. In a third example, no negative response is received at step 710, but the display 360 of the master player 300 is not capable of displaying digital signage content. The metric M calculated at step 715 is equal to $I_1+I_2+I_3=30+30+20=80$. The metric M (which consists of the actual number of impressions) is transmitted to the SSP platform 20 at step 725.

An adaptation of the previously mentioned first and second implementations is not provided, since these two implementations are not adapted for dealing with individual impression numbers per display.

The behavior of the slave players 400 will not be detailed, since steps 605, 610 and 615 of the method 600 represented in FIG. 5 are applicable to the present use case. More specifically, steps 605 and 610 are performed by the slave players 400 upon reception of the synchronization request sent by the master player 300 at step 705. Step 615 is performed by any of the slave players 400 having determined that it is not capable of displaying a digital signage content.

The execution of the method 700 by the master player 300 is triggered by the reception of a request from the SSP platform 20, as illustrated in FIG. 9. The request is received via the communication interface 330 of the master player 300. Upon reception of the request, the processing unit 310 executes steps 705 to 725 of the method 700.

For example, the SSP platform 20 initiates a bidding process involving one or more DSP platform 10. The SSP platform 20 sends the request to the master player 300 and receives in return the metric M representative of the actual number of impressions provided by the master player 300 and the one or more slave player 400. The SSP platform 20 calculates the actual number of impression (provided by the master player 300 and the one or more slave player 400) using the metric M. The bidding process is then performed, using the actual number of impressions as a parameter. Thus, the bids of the DSP platforms 10 are based on the actual number of impressions available (e.g. only 75 if one display is not available, which is more accurate than the nominal number of impressions available (e.g. 100).

When the method 700 is used for supporting a bidding process implemented by the SSP platform 20, the method 700 can be executed on its own, independently of the method 500 represented in FIG. 3.

Alternatively, the execution of the method 700 by the master player 300 is not triggered by the reception of a request from the SSP platform 20. The execution of the method 700 is triggered by condition(s) being met at the master player 300. For example, the method 700 is used for supporting a proof of display process and is integrated to the method 500 represented in FIG. 3.

Steps 705 and 710 respectively correspond to steps 510 and 515 of FIG. 3. Steps 715 to 725 are performed after a negation determination is made at step 520 of FIG. 3 (NO). For example, steps 715 to 725 are performed immediately before or immediately after step 535 of FIG. 3. In this case, the synchronization request sent at step 705 contains an identifier of a given digital signage content (as mentioned previously when describing step 510 of FIG. 3).

The method 700 illustrated in FIG. 8 is not limited to the field of digital signage. This method applies more generally to the synchronized display of a digital content (e.g. a video, a still image, etc.) on a master computing device (corresponding to the aforementioned master player 300) and on one or more slave computing device (corresponding to the aforementioned slave player 400).

Furthermore, step 725 has been described in the context of the transmission of the metric M to the SSP platform 20. However, at step 725, the metric M may be transmitted to any server using the metric M for implementing a functionality based on the metric M. The term server is used in a broad and general sense, to include any computing device capable of interacting with the master player 300.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A method for determining an actual number of impressions provided by a synchronized group of devices comprising a master computing device and one or more slave computing device, the method comprising:
   transmitting by a processing unit of the master computing device a synchronization request to the one or more slave computing device;
   determining by the processing unit of the master computing device a number of negative responses received from the one or more slave computing device in response to the synchronization request, each negative response being indicative of one among the one or more slave computing device not being capable of displaying digital content on a display of the one among the one or more slave computing device, the number of negative responses received R being an integer comprised between 0 and N where N is the number of slave computing devices, N being an integer greater or equal than 1;
   determining by the processing unit of the master computing device a number of displays D capable of displaying digital content based on the number of negative responses R, D being equal to N+1−R if a display of the master computing device is capable of displaying digital content and D being equal to N−R if the display of the master computing device is not capable of displaying digital content;
   determining by the processing unit of the master computing device a metric representative of the actual number of impressions provided by the master computing device and the one or more slave computing device, the metric being calculated based on the number of displays D capable of displaying digital content; and
   transmitting by the processing unit of the master computing device the metric representative of the actual number of impressions provided by the master computing device and the one or more slave computing device to a server.

2. The method of claim 1, wherein a processing unit of the server receives the metric transmitted by the master computing device and processes the metric to calculate the actual number of impressions provided by the master computing device and the one or more slave computing device.

3. The method of claim 2, wherein the actual number of impressions is used by the server for at least one of the following: a bidding process implemented by the server and a proof of play process implemented by the server.

4. The method of claim 1, wherein the metric M representative of the actual number of impressions consists of the number of displays D capable of displaying digital content.

5. The method of claim 4, wherein a memory of the server stores a number of impressions per display I and a processing unit of the server calculates the actual number of impressions by multiplying M by I.

6. The method of claim 1, wherein the metric M representative of the actual number of impressions consists of a percentage of displays capable of displaying digital content, the metric M being proportional to D/N+1.

7. The method of claim 6, wherein a memory of the server stores a number of impressions per display I and a total number of displays N+1, and a processing unit of the server calculates the actual number of impressions by multiplying M by (N+1) by I.

8. The method of claim 1, wherein the metric M consists of the actual number of impressions calculated by multiplying the number of displays D capable of displaying digital content by a number of impressions per display, the number of impressions per display being stored in the memory of the computing device.

9. The method of claim 8, wherein a processing unit of the server receives the metric M consisting of the actual number of impressions.

10. The method of claim 1, wherein the processing unit of the master computing device determines that the display of the master computing device is not capable of displaying digital content and D is equal to N−R.

11. The method of claim 1, wherein the master computing device consists of a master digital signage player adapted for displaying digital signage content, and the one or more slave computing device consists of one or more slave digital signage player adapted for displaying digital signage content.

12. The method of claim 1, wherein the synchronization request is broadcasted.

13. The method of claim 1, wherein the transmission of the synchronization request to the one or more slave computing device is triggered by a reception of a request from the server.

14. The method of claim 1, further comprising storing by the processing unit of the master computing device in a memory of the master computing device a digital content identifier identifying a given digital content; and wherein the synchronization request comprises the digital content identifier, the number of negative responses received R is lower than a threshold, and the method further comprises transmitting by the processing unit of the master computing device a display command to the one or more slave computing device for displaying the given digital content on the one or more slave computing device, the display command comprising the digital content identifier.

15. A non-transitory computer program product comprising instructions executable by a processing unit of a master computing device, the execution of the instructions by the processing unit of the master computing device providing for determining an actual number of impressions provided by a synchronized group of devices comprising the master computing device and one or more slave computing device by:
- transmitting by the processing unit of the master computing device a synchronization request to the one or more slave computing device;
- determining by the processing unit of the master computing device a number of negative responses received from the one or more slave computing device in response to the synchronization request, each negative response being indicative of one among the one or more slave computing device not being capable of displaying digital content on a display of the one among the one or more slave computing device, the number of negative responses received R being an integer comprised between 0 and N where N is the number of slave computing devices, N being an integer greater or equal than 1;
- determining by the processing unit of the master computing device a number of displays D capable of displaying digital content based on the number of negative responses R, D being equal to N+1−R if a display of the master computing device is capable of displaying digital content and D being equal to N−R if the display of the master computing device is not capable of displaying digital content;
- determining by the processing unit of the master computing device a metric representative of the actual number of impressions provided by the master computing device and the one or more slave computing device, the metric being calculated based on the number of displays D capable of displaying digital content; and
- transmitting by the processing unit of the master computing device the metric representative of the actual number of impressions provided by the master computing device and the one or more slave computing device to a server.

16. A master computing device adapted for determining an actual number of impressions provided by a synchronized group of devices comprising the master computing device and one or more slave computing device, the master computing device comprising:
- a communication interface for exchanging data with the one or more slave computing device;
- a display; and
- a processing unit comprising one or more processor for:
  - transmitting via the communication interface a synchronization request to the one or more slave computing device;
  - determining a number of negative responses received via the communication interface from the one or more slave computing device in response to the synchronization request, each negative response being indicative of one among the one or more slave computing device not being capable of displaying digital content on a display of the one among the one or more slave computing device, the number of negative responses received R being an integer comprised between 0 and N where N is the number of slave computing devices, N being an integer greater or equal than 1;
  - determining a number of displays D capable of displaying digital content based on the number of negative responses R, D being equal to N+1−R if the display of the master computing device is capable of displaying digital content and D being equal to N−R if the display of the master computing device is not capable of displaying digital content;
  - determining a metric representative of the actual number of impressions provided by the master computing device and the one or more slave computing device, the metric being calculated based on the number of displays D capable of displaying digital content; and
  - transmitting via the communication interface the metric representative of the actual number of impressions provided by the master computing device and the one or more slave computing device to a server.

17. The master computing device of claim 16, wherein the metric M representative of the actual number of impressions consists of the number of displays D capable of displaying digital content.

18. The master computing device of claim 16, wherein the metric M representative of the actual number of impressions consists of a percentage of displays capable of displaying digital content, the metric M being proportional to D/N+1.

19. The master computing device of claim 16, wherein the metric M consists of the actual number of impressions calculated by multiplying the number of displays D capable of displaying digital content by a number of impressions per display, the number of impressions per display being stored in the memory of the computing device.

20. The master computing device of claim 16, wherein the processing unit of the master computing device determines that the display of the master computing device is not capable of displaying digital content and D is equal to N−R.

21. The master computing device of claim 16, wherein the master computing device consists of a master digital signage player adapted for displaying digital signage content, and the one or more slave computing device consists of one or more slave digital signage player adapted for displaying digital signage content.

22. The master computing device of claim 16, wherein the synchronization request is broadcasted.

23. The master computing device of claim 16, wherein the transmission of the synchronization request to the one or more slave computing device is triggered by a reception via the communication interface of a request from the server.

24. The master computing device of claim 16, wherein the processing unit further stores in a memory of the master computing device a digital content identifier identifying a given digital content, the synchronization request comprises the digital content identifier, the number of negative responses received R is lower than a threshold, and the processing unit further transmits via the communication interface a display command to the one or more slave computing device for displaying the given digital content on the one or more slave computing device, the display command comprising the digital content identifier.

\* \* \* \* \*